April 14, 1925.  
C. I. LOTT  
1,533,746  
METHOD OF ASSEMBLING ROLLER BEARINGS  
Filed Dec. 14, 1922
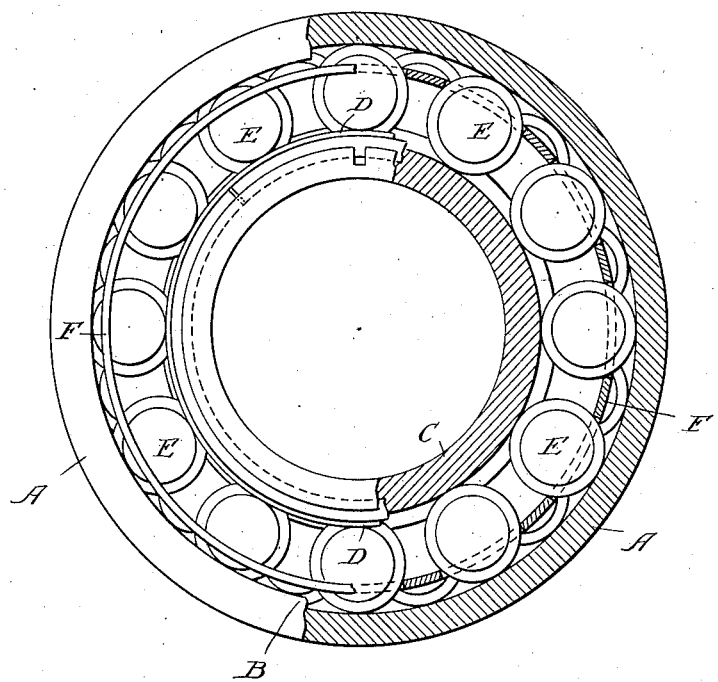
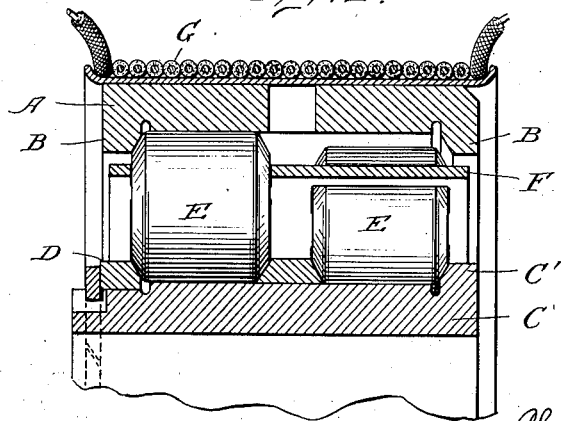
Witness,
Edwin L. Bradford
Inventor
Charles I. Lott
By Greene & Greene
Attorneys Patented Apr. 14, 1925.

1,533,746

UNITED STATES PATENT OFFICE.

CHARLES I. LOTT, OF NORFOLK, VIRGINIA.

METHOD OF ASSEMBLING ROLLER BEARINGS.

Application filed December 14, 1922. Serial No. 606,932.

*To all whom it may concern:*

Be it known that I, CHARLES I. LOTT, a citizen of the United States, and resident of Norfolk city, and State of Virginia, have invented certain new and useful Improvements in Methods of Assembling Roller Bearings, of which the following is a specification, reference being had therein to the accompanying drawing.

In various structures involving many loose parts which are to be brought into exact predetermined positions, assembling is a slow and difficult matter even when apparatus devised by many inventors is used. Where the loose parts are of magnetic material I eliminate all difficulty by the method which consists in applying magnetic force in proper location to hold each of the loose bodies as it is moved into its desired location.

For illustrating the application of the method suggested, a roller bearing has been selected.

Such bearings commonly involve two relatively rotatable main members separated by rollers, of spherical form or otherwise, which travel in an endless path while rotating on their own axes and transmitting strains from one main member to the other, all being meantime held accurately in predetermined spaced relation by a loose train or "cage," whether the rollers are arranged in one or more annular sets.

I have discovered that by employing magnetic force for temporarily holding parts in desired positions, the whole difficulty vanishes, assembling becoming a matter of a few seconds, even with a type of bearing in which each of the many rollers must first be moved, axially with respect to the bearing, to its proper plane and then be moved radially and held until all the rollers of the one or many sets are in place.

In the accompanying drawings,

Figure 1 is an end elevation of a bearing and my devices, parts being broken away.

Figure 2 is an axial section of the upper portion of the same devices.

In these figures, A represents an annular sleeve-like steel race having at each end a continuous integral inwardly projecting flange B absolutely preventing rollers in place from escaping until they have first moved inwardly far enough to clear the flanges B. C designates a smaller concentric sleeve, or second main member, of the bearing. This sleeve C has at one end an integral continuous flange C', which projects toward the corresponding flange B, and has at the opposite end an analogous but removable flange D.

Between the flanges at the ends of the main members A and C fit annularly arranged rollers E which are spaced apart, in the one or more sets which may be used, two annular sets being shown in this instance, by a cage F which may be of common construction. About the outer member is placed an electric coil G. The rollers all being in place, the sleeve C, when slipped endwise into place and suitably secured against reverse movement, holds all the rollers in proper position.

The cage being loosely inserted in the race A, it is a simple matter to place each roller in the outer race and then move it radially outward into its recess in the cage.

Practically a mass of rollers is placed in the outer race member and stirred or moved about with the fingers or otherwise, and each quickly finds its place in the cage and is held by the coil.

When the inner main member has been put in place and secured, the rollers are securely held mechanically and the coil may be removed.

What I claim is:

1. In assembling magnetic parts of mechanical structures, the method which consists in supplying electro-magnetic devices in position to hold said parts magnetically, adjusting the parts as desired, securing them mechanically, and breaking the electro-magnetic circuit.

2. The method of assembling magnetic rollers between main bearing members, which consists in making one of said members a magnet, adjusting the rollers in contact therewith, and applying the other bearing member while the rollers are magnetically held in adjustment.

3. The method of assembling between relatively rotatable bearing members a cage and magnetic bearing rollers, which consists in applying electro-magnetic force to hold the rollers in the corresponding recesses in the cage while the latter and one of said members are in place, supplying the rollers, and adding the other member, while the rollers are so held, to secure the parts mechanically in proper assembled positions.

In testimony whereof I hereunto affix my signature.

CHARLES I. LOTT.